US007824526B2

(12) United States Patent
Yuan et al.

(10) Patent No.: US 7,824,526 B2
(45) Date of Patent: Nov. 2, 2010

(54) ADAPTIVE SPINDLE ASSEMBLY FOR ELECTROEROSION MACHINING ON A CNC MACHINE TOOL

(75) Inventors: Renwei Yuan, Shanghai (CN); Yimin Zhan, Shanghai (CN); Ugo Cantelli, Rome (IT); Yuanfeng Luo, Shanghai (CN); Garth M. Nelson, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 995 days.

(21) Appl. No.: 11/608,884

(22) Filed: Dec. 11, 2006

(65) Prior Publication Data

US 2008/0135418 A1 Jun. 12, 2008

(51) Int. Cl.
*B23H 7/32* (2006.01)

(52) U.S. Cl. ................. 204/224 M; 205/654; 219/69.1; 219/69.18

(58) Field of Classification Search ............ 204/224 M; 205/654; 219/69.1, 69.18
See application file for complete search history.

(56) References Cited

U.S. PATENT DOCUMENTS 5,900,134 A 5/1999 Steneler et al.
6,264,822 B1 7/2001 Wei et al.
6,403,910 B1 * 6/2002 Stang et al. .............. 219/69.11
6,416,283 B1 7/2002 Johnson et al.
6,627,054 B2 9/2003 Wei et al.
6,642,470 B2 11/2003 Tricarico et al.
6,835,229 B2 12/2004 Brown et al.
6,846,227 B2 1/2005 Sato et al.
6,858,125 B2 2/2005 Wei et al.
6,897,400 B1 5/2005 Yuan et al.
6,968,290 B2 11/2005 Wei et al.
2005/0218089 A1 10/2005 Wei et al.
2005/0247569 A1 11/2005 Lamphere et al.

* cited by examiner

*Primary Examiner*—Harry D. Wilkins, III
*Assistant Examiner*—Nicholas A. Smith
(74) *Attorney, Agent, or Firm*—Andrew J. Caruso

(57) ABSTRACT

An apparatus and method for adapting a CNC milling machine for electroerosion machining. The apparatus includes a tubular electrode on the distal end of an adapter shaft. A tool holder on the proximal end of the adapter shaft is mountable in the chuck of a cutter spindle in the milling machine. The adapter shaft is rotatably mounted within a bearing and an electrical brush contact subassembly, both of which are supported by a bracket. The bracket is attached to the milling machine but insulates it from the tool electrode. The bearing supports the adapter shaft in alignment with the CNC spindle. An electrical power supply energizes the electrode and the workpiece for electroerosion in a gap between them. Electrolyte is circulated through the spinning tool electrode during operation. The CNC computer is configured to operate the machine, power supply, and electrolyte flow for electroerosion machining.

18 Claims, 4 Drawing Sheets

40 50 40 38 48 23 CNC Milling Machine 36 External Flushing 24 21 46 30 28 44 20 42 66 32 27 DC Power NC Computer Electrolyte Pump & Filtration 60 62 64 Internal flushing 27
28
22
91
74
73
21
50
90
97
96
66
73
82
80,81
92
88
20
89
86
48
48
94 95
98
64
72
86
84
25
24
99
23

20
21
22
23
24
25
26
27
28
48
50
66
72
73
74
82
86
88
89
90
91
96
97
98
99
180,81
184
192

20
27
28
22
91
74
73
21
50
90
97
96
66
73
82
80,81
92
88
89
86
48
48
94 95
98
64
72
99i
86
84
25
24
99
29
23

ADAPTIVE SPINDLE ASSEMBLY FOR ELECTROEROSION MACHINING ON A CNC MACHINE TOOL

CROSS-REFERENCE TO RELATED APPLICATIONS

This application is related to U.S. patent application Ser. No. 10/842,344, filed May 7, 2004, assigned to the present assignee, and published as U.S. patent application publication 20050247569. The foregoing application is incorporated by reference herein in its entirety.

BACKGROUND

The present invention relates in general to electroerosion milling (EEM), and more specifically to an adaptive spindle that modifies a Computer Numerical Control (CNC) machine tool, such as a CNC milling machine for EEM.

Electroerosion machining is performed by passing an electrical current through a gap between an electrode and a workpiece for removal of material on the workpiece. It uses direct-current (DC) voltages to electrically power removal of the material from the workpiece. An electrolyte is circulated between the tool electrode and the workpiece to facilitate electroerosion of the workpiece material, and to cool and flush the gap region. This process enables a high rate of material removal with low thermal damage to the workpiece. An advanced form of electroerosion machining using a spinning tool electrode is described in related U.S. patent application Ser. No. 10/842,344.

EEM provides quicker machining and higher efficiencies than mechanical cutting or other electrical discharge machining (EDM) methods in various applications, such as turbine impeller and bladed disk roughing and machining. It is believed, however, that prior to the present invention there has been no practical way to convert a conventional CNC milling machine for EEM operation. Thus, EEM machines to date have been specialized systems.

BRIEF DESCRIPTION

An aspect of the invention resides in an adapter spindle assembly for a conventional multi-axis CNC machine tool such as a CNC milling machine that drives and controls movements of a cutter and workpiece to machine complex component geometries under software control. The present adapter converts such a milling machine to operate by EEM.

Another aspect of the invention resides in such an EEM adapter spindle assembly including a tool electrode configured to machine a workpiece located across a gap from the tool electrode. Machining is achieved by electroerosion powered by an electrical potential across the gap, and facilitated by an electrolyte flushing liquid circulated into the gap. A power supply is configured to energize the tool electrode and workpiece.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
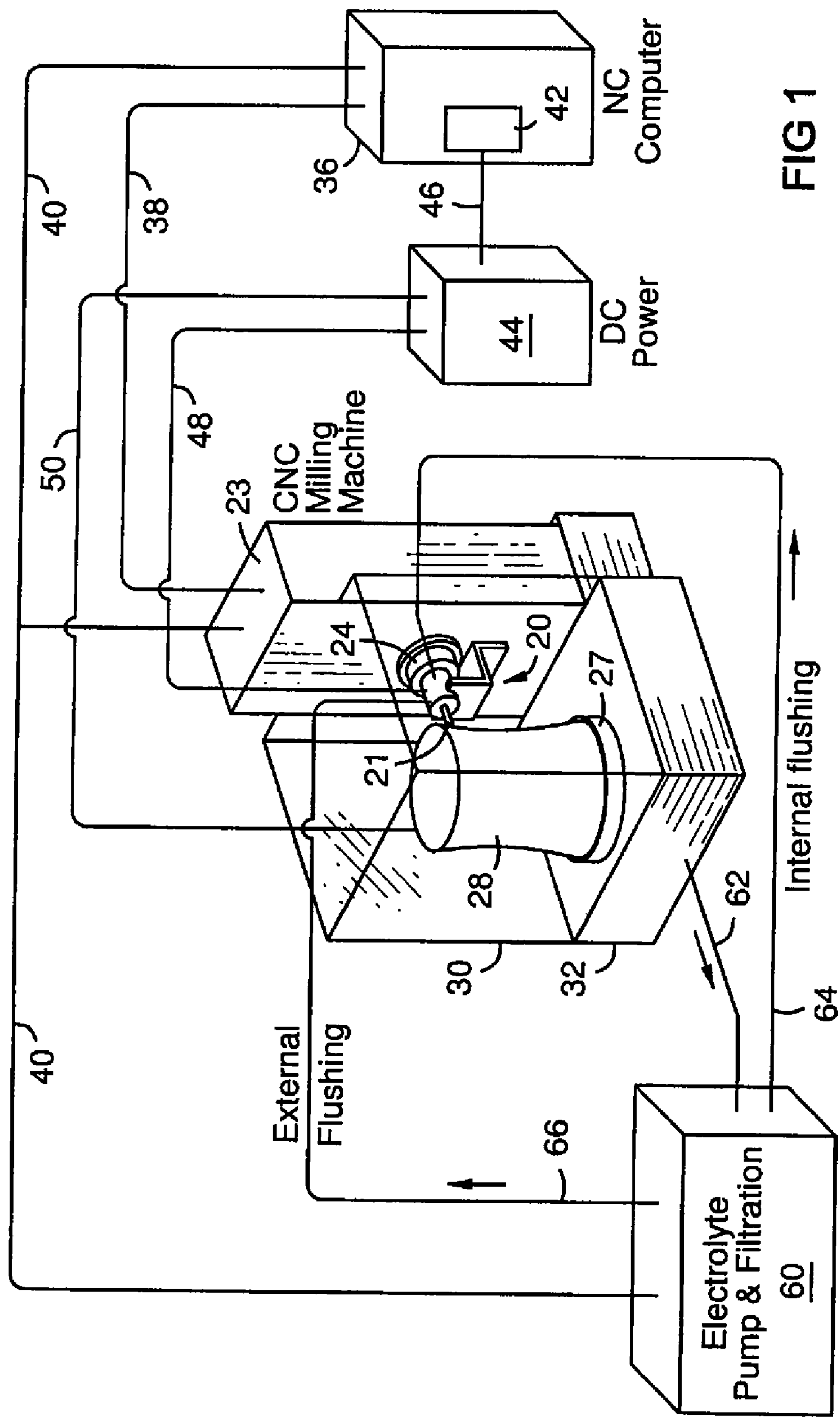
FIG. 1 is a schematic illustration of an EEM adaptive spindle according to one embodiment of the invention as may be used on a conventional CNC milling machine.

FIG. 1 schematically illustrates a CNC milling machine 23 modified for electroerosion machining by installing an EEM adaptive spindle assembly 20 with a spinning tool electrode 21. The CNC milling machine 23 has a spindle 24 that normally holds a mechanical milling tool as known in the art. A workpiece carrier 27 holds and moves a workpiece 28 relative to the milling tool by rotating and translating the workpiece carrier via servos. A computer 36 executes stored programs to send control signals 38 to the servos and electronics that operate the CNC machine. Signal and control circuits 40 communicate operating conditions to the computer 36, and may also communicate related control signals from the computer such as automatic system shut-off in case of overheating, low fluid, and the like.

To adapt a CNC milling machine 23 for EEM usage, an adaptive EEM spindle assembly 20 is mounted on the CNC tool spindle 24 as later described. Furthermore, an EEM numerical control program is installed in the CNC computer 36, and a DC power supply 44 is provided to energize the EEM tool electrode 21 for electroerosion in the gap between the tool electrode 21 and the workpiece 28. A custom plug-in circuit board 42 may be installed in the CNC computer 36 as an interface for a signaling link 46 between the power supply 44 and the CNC computer. A first electrical potential is conducted 48 to the EEM tool electrode from the power supply 44, and a second electrical potential is conducted 50 to the workpiece 28, forming an electrical circuit 48, 50 including the gap.

This generates discharges in the gap 74 between the workpiece 28 and the tool electrode 21. The CNC computer 36 controls servos in the CNC milling machine 23 to perform relative movements between the tool electrode 21 and the workpiece 28 as known in the art of CNC machine tools, thus controlling the gap 74. The CNC computer 36 monitors and controls the EEM processes of the EEM adaptive spindle assembly 20, the associated power supply 44, and electrolyte pump 60.

A voltage measuring circuit in the power supply 44 senses the voltages across the gap via the power circuit 48, 50, and communicates this data via the signaling link 46 to the custom circuit board 42 in the CNC computer 36, providing information about the discharging status and condition of the gap 74. The EEM control program controls the machining feed rate and DC power profile for optimum operation based on this feedback. Circuits in the power supply may include, without limitation, a microprocessor or another computational device, a voltage measurement device, a timing device, a pulse generation device, a voltage comparison device, and a data storage device, among others. All such devices are well known in the art, and any such suitable device may be used without deviating from the scope of the invention.

CNC Machine tools are often equipped to spray a liquid on the cutter and workpiece 28 to cool them and to flush away etched particles. A shield 30 may collect the liquid into a collection tank or tub 32 for recycling via a filtration system. EEM uses a liquid electrolyte circulation system that serves these cooling and flushing functions and also enables electroerosion. The EEM electrolyte system may use some existing liquid circulation components of the CNC milling machine 23, such as the shield 30 and collection tank 32. Other EEM specialized components may be adapted or added as needed. For example, a separate electrolyte pump and filtration unit 60 may be provided for connection by a fluid return line 62 from the existing collection tank 32. An internal flushing fluid supply line 64 may provide a first flow of electrolyte from the pump 60 for internal flushing as later described. An external flushing fluid supply line 66 may provide a second flow of electrolyte for external flushing as later described. Filtration may be performed for example as described in US patent application publication 20050218089A1, assigned to the present assignee. The electrolyte pump 60 may be electronically connected 40 to the control computer 36 for data communication to the computer, and for control communication from the computer. This enables flow control and machining shut down for overheating or low fluid conditions.

Figure 2:
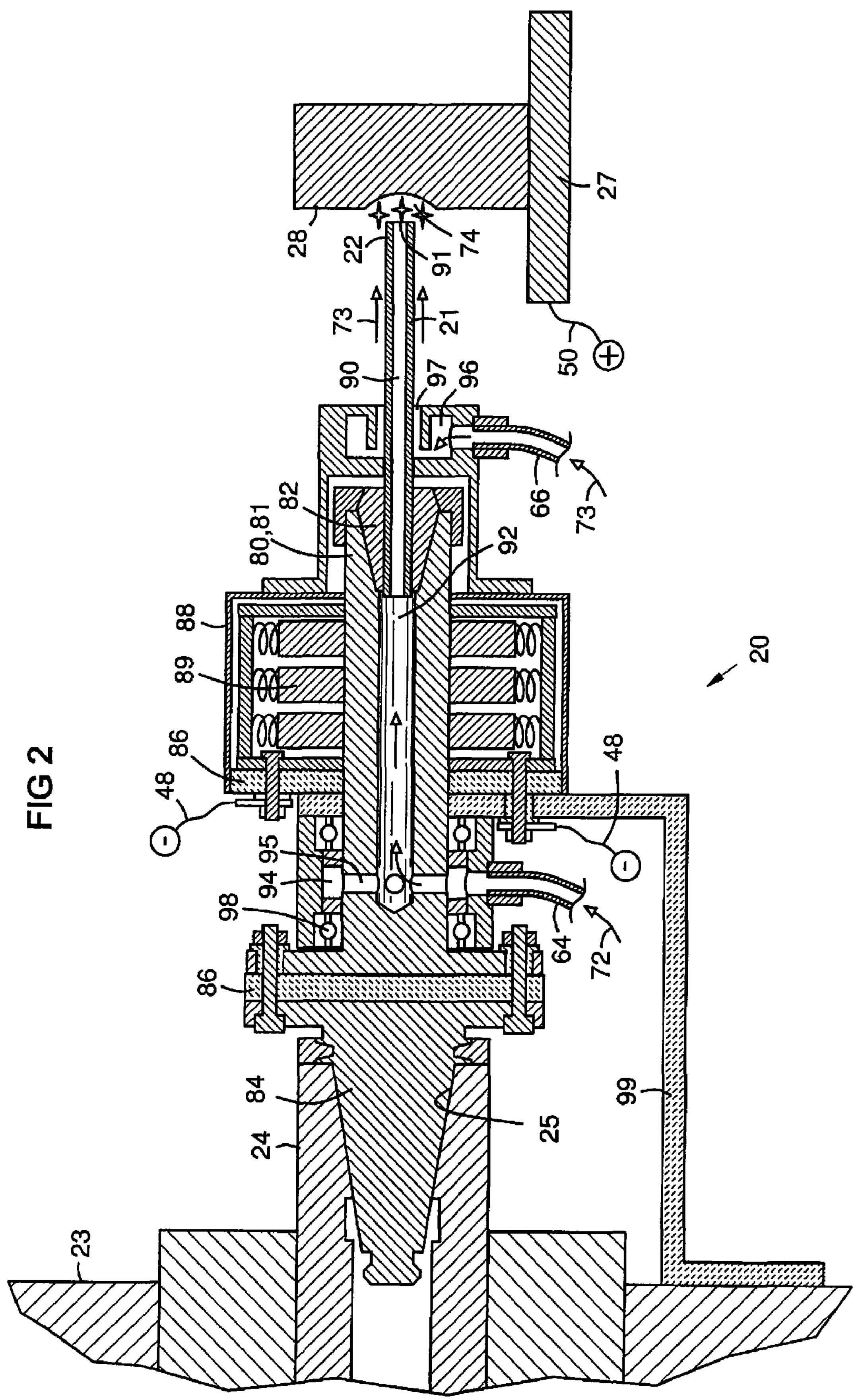
FIG. 2 illustrates an EEM adaptive spindle assembly according to a first embodiment of the invention.

FIG. 2 shows an EEM spindle adapter assembly 20 including a tool electrode 21 positioned across a gap 74 from a workpiece 28. The power supply 44 generates electrical discharges in the gap 74 that machine the workpiece 28. The discharges cause particles to separate from the workpiece 28, thereby machining the workpiece.

The tool electrode 21 may be removably mounted on the distal end 81 of a rotatable adapter shaft 80 by means of a collet 82. A tool holder 84 is fixed to the proximal end of the adapter shaft 80, and mates with the tool chuck 25 on the CNC spindle 24. The adapter shaft 80 is electrically insulated from the CNC spindle 24 by insulation 86 between the adapter shaft 80 and the tool holder 84. The power supply 44 may energize the tool electrode 21 by applying pulses of a voltage difference $\Delta V$ between the lead 48 conducting to the tool electrode and the lead 50 conducting to the workpiece. This power is conducted between the lead 48 and the spinning adapter shaft 80 by means of a stationary-to-rotary conduction device, such as a subassembly 88 of electrical brush contacts 89. Alternately a rotary transformer (not shown) may be used. Rotary transformers induce electrical current into a rotating conductor without physical contact from a stationary conductor.

First and second flows 72, 73 of liquid electrolyte may be provided for internal and external flushing, respectively. As shown in FIG. 2 the first flow of liquid electrolyte 72 is supplied to an axially-oriented conduit 90 in the tool electrode 21 via an axially-oriented conduit 92 in the adapter shaft 80. The electrolyte 72 may enter the conduit 92 in the adapter shaft 80 by means of a fluid input manifold 94 that is sealed around a portion of the adapter shaft 80. This fluid input manifold 94 passes the fluid 72 to the conduit 92 in the shaft 80 via generally radially-oriented flow paths 95 in the shaft 80. The electrolyte 72 thus can flow into the conduit 92 while the shaft 80 spins, and into the tool electrode conduit 90. It exits an opening 91 in the distal end 22 of the tool electrode 21, where it circulates through the gap 74, enabling electroerosion, flushing, removing etched particles efficiently, and cooling.

Figure 3:
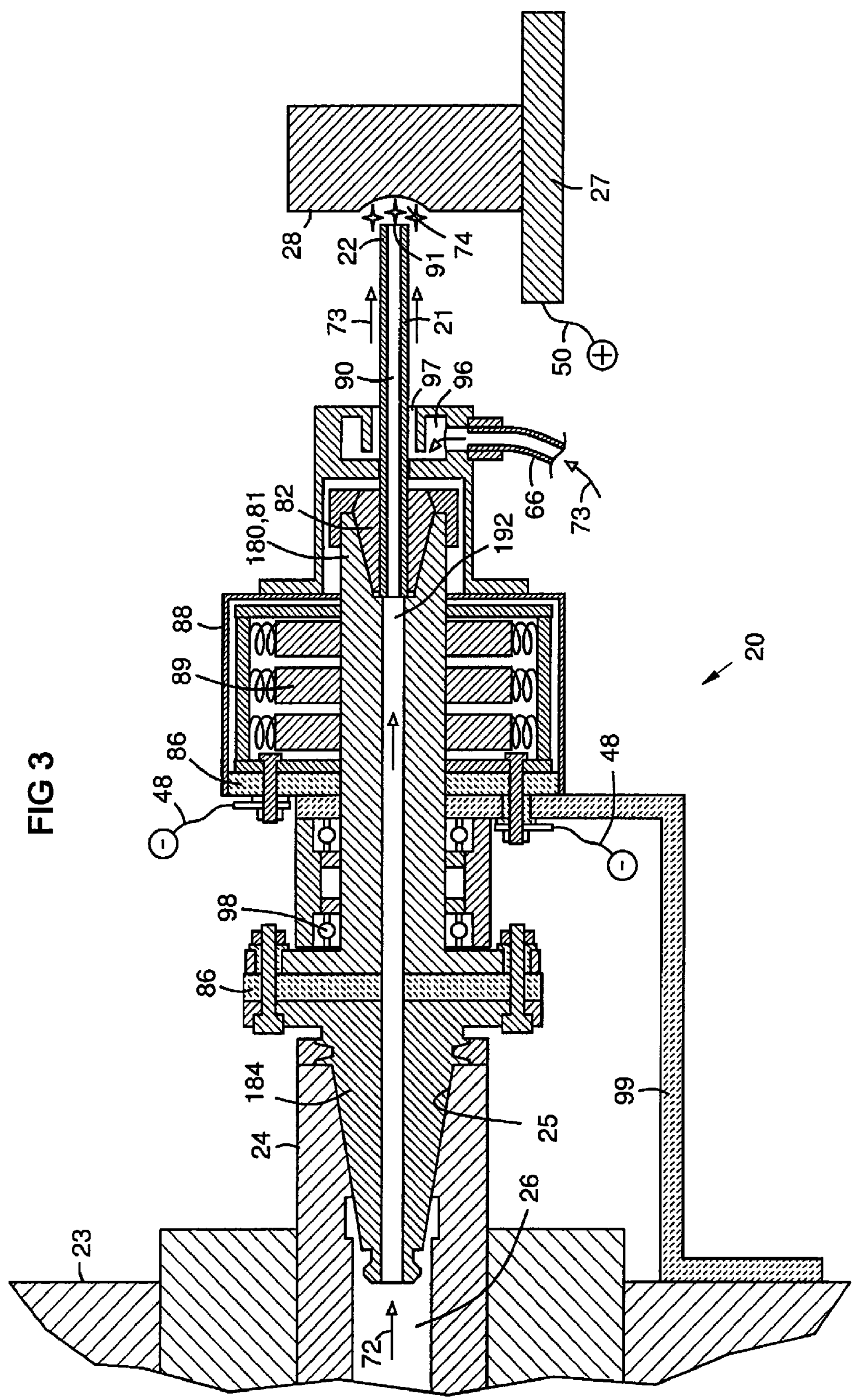
FIG. 3 illustrates an EEM adaptive spindle assembly according to a second embodiment of the invention.

FIG. 3 illustrates a second embodiment for supplying the first flow 72 of the electrolyte to the tool electrode. Some CNC milling machines provide "through-the-spindle" flushing via a fluid channel 26 in the spindle 24. This channel 26 may be utilized by extending the conduit 192 in the adapter shaft 180 through the tool holder 184 as shown. In this case, a fluid input manifold 94 as in FIG. 2 is not needed.

A second flow 73 of liquid electrolyte may be provided for external flushing, in which the liquid 73 is sprayed toward the distal end 22 of the tool electrode 21 from outside the tool electrode. FIGS. 2 and 3 show a way to provide external flushing by means of a spray manifold 96 mounted around the distal end 81 of the adapter shaft 80, 180 and attached to the brush subassembly 88. The spray manifold 96 has fluid outlets 97 around the tool electrode 21 for spraying the liquid 73 alongside the tool electrode. Alternately or additionally, other external nozzles not shown may be used that are not attached to the adaptive spindle assembly 20.

Figure 4:
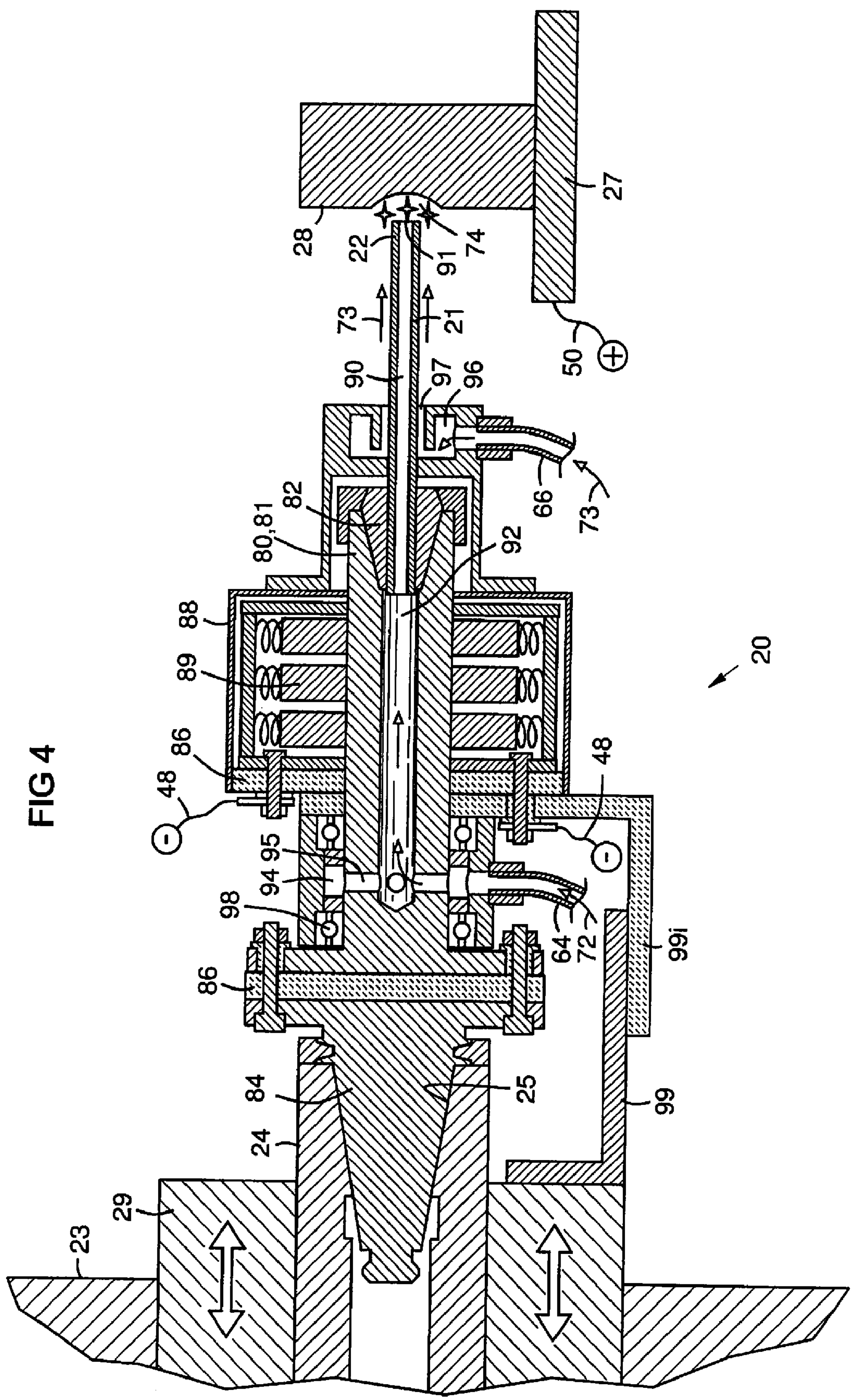
FIG. 4 illustrates an EEM adaptive spindle assembly mounted on a movable spindle carrier of a CNC milling machine.

The adapter shaft 80 is mounted on a low-friction bearing 98. The bearing 98 and the brush subassembly 88 are supported by a bracket 99 that is attached to the CNC milling machine 23. The bearing 98 supports the adapter shaft in alignment with the CNC spindle 24. The adapter assembly 20 is electrically insulated from the CNC milling machine 23. The bracket 99 may be made of an electrically insulating material as illustrated in FIGS. 2 and 3, or it may have an insulating portion 99i as in FIG. 4. The bracket 99 may be attached to a stationary part of the CNC milling machine 23 as shown in FIGS. 1-3. In this case, CNC movements of the workpiece 28 relative to the tool electrode 21 are performed by the workpiece carrier 27, as known in the art of CNC milling machines. Alternately, the bracket 99 may be attached to a movable spindle carrier 29 as illustrated in FIG. 4. In this case, CNC movements of the workpiece 28 relative to the tool electrode 21 may be performed by the spindle carrier 29 and/or the workpiece carrier 27. The movable spindle carrier 29 may be a piston as shown, or it may be a spindle drive mechanism mounted on multiple orthogonal ways or tracks as known in the art of CNC milling machines.

An EEM system according to aspects of this invention may use a pulse or continuous direct current power with an open voltage range from about 31V to 70V, and an average current range from about 100 A to 3000 A, with the positive potential connected to the workpiece 28 and negative potential connected to the tool electrode 21; an internal/external water-based flushing electrolyte 72, 73 with a pressure range from about 100 psi to 1000 psi; a rotary tube electrode 21 with a conductive wall material such as graphite or brass; and a revolution speed range of about 500 rpm to 10,000 rpm. These details are provided as examples only, and are not limiting of the invention.

The present adaptive spindle for EEM allows a conventional CNC milling machine 23 to use either electroerosion discharging milling or conventional milling. Example advantages of EEM may include: 1) High material removal rate. Material removal rates of over 20000 cubic mm/min have been demonstrated using a 32 mm diameter tube electrode. 2) Low cutting force. 4) Low tooling cost, since an EEM electrode may be a simple tube of a low cost material compared to conventional milling tools that require high strength, high hardness, and complex cutter shapes. 5) Low tool maintenance, since an EEM tool electrode is not sharpened, but is simply replaced.

In operation, EEM provides quicker machining and higher efficiencies than mechanical cutting or other electrical discharge machining (EDM) methods in various applications, such as turbine impeller and bladed disk roughing and machining. In an EEM assembly, a voltage potential is generated across a gap between an electrode and a workpiece to be machined, resulting in an electrical discharge in the gap. When the machining electrode approaches the workpiece surface separated by the gap, an electrical discharge occurs through the gap due to the voltage. The gap, which constitutes a machining zone, is filled with a liquid electrolyte. The EEM system provides a flow of electrolyte, which removes eroded particles from the gap and provides a suitable medium for electrical discharge.

Tests have shown that airfoils made of metal alloy, such as Inconel 718 metal alloy, can be produced using the above described process. These tests have indicated a substantial increase in machining speed and a substantial reduction in tooling cost over mechanical machining under test conditions using, for example, a 4-axis numerical control and a pulsed DC power supply.

Inconel 718 is one example of a relatively high-strength, high-temperature and corrosion resistant nickel-chromium super alloy. It is suitable for use in air up to 1300 F. It is readily worked and can be age-hardened. This alloy may comprise approximately the following element percentages by weight:

| | |
|---|---|
| Aluminum | 0.2-0.8 |
| Boron | 0.006 max |
| Carbon | 0.08 max |
| Chromium | 17-21 |
| Cobalt | 1 max |
| Copper | 0.3 max |
| Iron | Balance |
| Manganese | 0.35 max |
| Molybdenum | 2.8-3.3 |
| Nickel | 50-55 |
| Niobium | 4.75-5.5 |
| Phosphorus | 0.015 max |
| Silicon | 0.35 max |
| Sulphur | 0.015 max |
| Titanium | 0.65-1.15 |

While only certain features of the invention have been illustrated and described herein, many modifications and changes will occur to those skilled in the art. It is, therefore, to be understood that the appended claims are intended to cover all such modifications and changes as fall within the true spirit of the invention.

| ELEMENT LIST | |
|---|---|
| 20 | Adaptive spindle assembly |
| 21 | EEM tool electrode |
| 22 | Distal end of EEM tool electrode |
| 23 | Computer Numerical Control (CNC) milling machine |
| 24 | CNC machine spindle |
| 25 | Chuck on CNC spindle |
| 26 | Through-the-spindle flushing liquid channel |
| 27 | Workpiece carrier |
| 28 | Workpiece |
| 29 | CNC movable spindle carrier |
| 30 | Shield |
| 32 | Liquid collection tank or tub |
| 36 | CNC computer |
| 38 | Data and control signals between the milling machine and computer |
| 40 | Data and control signals between the electrolyte system and computer |
| 42 | Custom circuit board in CNC computer |
| 44 | DC power supply |
| 46 | Communication link between the power supply and the CNC computer |
| 48 | Electrical conductor to tool electrode via brush subassembly |
| 50 | Electrical conductor to workpiece |
| 60 | Electrolyte pump and filtration unit |
| 62 | Fluid return line |
| 64 | Internal flushing supply line |
| 66 | External flushing supply line |
| 72 | Internal flushing electrolyte flow |
| 73 | External flushing electrolyte flow |
| 74 | Gap between tool electrode and workpiece |

-continued

| ELEMENT LIST | |
|---|---|
| 80 | Adapter shaft |
| 180 | Alternate adapter shaft for through-the-spindle internal flushing |
| 81 | Distal end of adapter shaft |
| 82 | Collet for holding tool electrode in adapter shaft |
| 84 | Tool holder on adapter shaft for mounting in CNC spindle chuck |
| 184 | Alternate tool holder for use with internal through-the-spindle flushing |
| 86 | Electrical insulation |
| 88 | Electrical brush contact subassembly |
| 89 | Electrical brush |
| 90 | Conduit in tool electrode for internal flushing |
| 91 | Exit hole in distal end of tool electrode for internal flushing |
| 92 | Conduit in adapter shaft for internal flushing |
| 192 | Conduit in adapter shaft for internal through-the-spindle flushing |
| 94 | Fluid input manifold for internal flushing |
| 95 | Generally radially-oriented fluid flow path in adapter shaft |
| 96 | External flushing spray manifold |
| 97 | Opening in spray manifold for external flushing along tool electrode |
| 98 | Bearing |
| 99 | Bracket for mounting adapter assembly to CNC machine |
| 99i | Electrically insulating portion of bracket |

The invention claimed is:

1. An adaptive spindle assembly for electroerosion machining of a workpiece by a Computer Numerical Control (CNC) machine tool, the adaptive spindle assembly comprising:

a rotatable adapter shaft comprising a proximal end and a distal end;

a tool electrode comprising a proximal end and a distal end, the proximal end of the tool electrode mounted on the distal end of the adapter shaft;

a tool holder on the proximal end of the adapter shaft for insertion in a tool chuck on a spindle of a CNC machine tool, the tool holder electrically insulated from the adapter shaft;

a bracket attached to the CNC machine tool and supporting the adaptive spindle assembly;

a low friction bearing supported by the bracket and supporting the adapter shaft in alignment with the spindle;

a stationary-to-rotary electrical conduction device supported by the bracket and electrically insulated therefrom for electrically energizing the tool electrode; and a fluid channel that routes a fluid electrolyte from a pump to the distal end of the tool electrode;

whereby the tool electrode can be mounted on a spindle of a CNC machine tool via the adaptive spindle assembly for rotation and machining via electroerosion.

2. An adaptive spindle assembly as in claim 1, further comprising a power supply that supplies a first electrical potential to the tool electrode via the rotatable adapter shaft and the stationary-to-rotary electrical conduction device, and that supplies a second electrical potential to the workpiece.

3. An adaptive spindle assembly as in claim 1, wherein the fluid channel comprises:

an axially-oriented fluid conduit in the tool electrode; and an axially-oriented fluid conduit in the adapter shaft in fluid communication with the axially-oriented fluid conduit in the tool electrode.

4. An adaptive spindle assembly as in claim 3, further comprising a fluid input manifold sealed around a portion of the rotatable adapter shaft, wherein the rotatable adapter shaft comprises a fluid path that communicates between the fluid input manifold and the axially-oriented fluid conduit in the rotatable adapter shaft; whereby a fluid can flow from the fluid input manifold into the axially-oriented fluid conduit in the rotatable adapter shaft.

5. An adapter spindle assembly as in claim 3, wherein the axially-oriented fluid conduit in the rotatable adaper shaft extends through the tool holder for fluid communication with a through-the-spindle flushing conduit in a spindle of a CNC machine tool.

6. An adapter spindle assembly as in claim 1, wherein the fluid channel comprises external flushing means for spraying the fluid electrolyte externally toward the distal end of the tool electrode.

7. An adapter spindle assembly as in claim 6, wherein the external flushing means comprises a fluid spray manifold around the distal end of the rotatable adapter shaft, the fluid spray manifold comprising fluid outlets around the tool electrode for directing the fluid electrolyte alongside the tool electrode.

8. An adapter spindle assembly as in claim 1, further comprising a fluid electrolyte pump and filtration system that supplies a fluid electrolyte to the fluid channel.

9. An adapter spindle assembly as in claim 8, further comprising a power supply that supplies a first electrical potential to the tool electrode via the rotatable adapter shaft and the stationary-to-rotary electrical conduction device, and that supplies a second electrical potential to the workpiece, wherein the fluid electrolyte pump and filtration system and the power supply are electronically connected to a control computer on the CNC machine tool for data communication to said control computer and for control communication from said control computer.

10. A method of adapting a Computer Numerical Control (CNC) machine tool for electroerosion machining of a workpiece, comprising:

assembling a spindle adapter comprising an adapter shaft with a proximal end and a distal end, a tool electrode on the distal end, a tool holder on the proximal end, a bearing mounted around the adapter shaft, a stationary-to-rotary electrical conduction device mounted on the adapter shaft, and an axially-oriented fluid channel passing through the adapter shaft and the tool electrode;

mounting the tool holder in a spindle chuck of the CNC machine tool;

supporting the bearing and the stationary-to-rotary electrical conduction device on the CNC machine tool on a bracket, with the adapter shaft supported within the bearing in alignment with the spindle;

conducting a first electrical potential from a power supply to the stationary-to-rotary electrical conduction device; conducting a second electrical potential from a power supply to the workpiece; and routing an electrolyte fluid from a pump to the fluid channel.

11. The method of claim 10, further comprising:

mounting a spray manifold on the distal end of the adapter shaft and affixed to the stationary-to-rotary electrical conduction device for directing a portion of the electrolyte fluid along the tool electrode; and routing said portion of the electrolyte fluid to the spray manifold.

12. The method of claim 11, further comprising connecting the pump and the power supply electronically to a computer numerical controller of the CNC machine tool for data and control communication, and programming the computer numerical controller to operate the CNC machine tool as an electroerosion machine tool.

13. An adaptive spindle assembly for electroerosion machining of a workpiece on a CNC machine tool, the adaptive spindle assembly comprising:

a rotatable adapter shaft comprising a proximal end and a distal end;

a tool electrode comprising a proximal end and a distal end, the proximal end of the tool electrode releasably mounted on the distal end of the rotatable adapter shaft;

a tool holder on the proximal end of the rotatable adapter shaft for insertion in a tool chuck on a spindle of a CNC machine tool, the tool holder electrically insulated from the rotatable adapter shaft;

a low friction bearing around the rotatable adapter shaft, the low friction bearing mounted on a bracket attached to the CNC machine tool;

an electrical brush contact assembly attached to the bracket and electrically insulated therefrom for electrically energizing the rotatable adapter shaft;

an axially-oriented fluid channel in the tool electrode that is open at the distal end of the tool electrode;

an axially-oriented fluid channel in the rotatable adapter shaft in fluid communication with the axially-oriented fluid channel in the tool electrode;

a fluid spray manifold around the distal end of the rotatable adapter shaft, the fluid spray manifold comprising fluid outlets around the tool electrode for directing a fluid electrolyte alongside the tool electrode;

a fluid electrolyte pump and filtration system that supplies the fluid electrolyte to the axially-oriented fluid channel in the tool electrode via the axially-oriented fluid channel in the rotatable adapter shaft, and that supplies a portion of the fluid electrolyte to the fluid spray manifold; and a power supply that supplies a first electrical potential to the tool electrode via the rotatable adapter shaft and the electrical brush contact assembly, and that supplies a second electrical potential to the workpiece.

14. An adaptive spindle assembly as in claim 13, further comprising:

a fluid input manifold sealed around a portion of the rotatable adapter shaft, and a generally radially oriented fluid path in the rotatable adapter shaft that communicates between the fluid input manifold and the axially-oriented fluid channel in the rotatable adapter shaft;

whereby a fluid can flow from the fluid input manifold into the axially-oriented fluid channel in the rotatable adapter shaft.

15. An adaptive spindle assembly as in claim 13, wherein the axially-oriented fluid channel in the rotatable adapter shaft extends through the tool holder, and the fluid electrolyte pump and filtration system supplies at least a portion of the fluid electrolyte to an axially-oriented channel in a spindle of the CNC machine tool.

16. An adaptive spindle assembly as in claim 13, wherein the bracket is attached to a stationary part of the CNC machine tool.

17. An adaptive spindle assembly as in claim 13, wherein the bracket is attached to a movable spindle carrier on the CNC machine tool.

18. An adaptive spindle assembly as in claim 13, wherein the bracket comprises an electrically insulating portion.

* * * * *

UNITED STATES PATENT AND TRADEMARK OFFICE

CERTIFICATE OF CORRECTION

PATENT NO. : 7,824,526 B2
APPLICATION NO. : 11/608884
DATED : November 2, 2010
INVENTOR(S) : Yuan et al.

It is certified that error appears in the above-identified patent and that said Letters Patent is hereby corrected as shown below:

In Column 7, Line 5, in Claim 5, delete “adaper” and insert -- adapter --, therefor.

Signed and Sealed this
Fourth Day of January, 2011

David J. Kappos
*Director of the United States Patent and Trademark Office*